United States Patent [19]

Pokorny et al.

[11] Patent Number: 4,511,267

[45] Date of Patent: Apr. 16, 1985

[54] METHOD FOR CHANGING THE SUPPLY OF CHARACTERS IN AN IDEOGRAPHIC TYPEWRITER BY COMBINING AND STORING INDIVIDUAL CHARACTERS

[75] Inventors: Cornel Pokorny, Accum; Horst Brendes, Schortens, both of Fed. Rep. of Germany

[73] Assignee: Olympia Werke AG, Wilhelmshaven, Fed. Rep. of Germany

[21] Appl. No.: 442,606

[22] Filed: Nov. 17, 1982

[30] Foreign Application Priority Data

Dec. 9, 1981 [DE] Fed. Rep. of Germany ....... 3148685

[51] Int. Cl.³ .............................................. B41J 3/02
[52] U.S. Cl. ................................... 400/110; 400/121; 400/484; 178/30; 340/731; 340/751
[58] Field of Search ..................... 400/110, 484, 697.1, 400/63, 94, 98, 121, 482; 178/30; 340/731, 751

[56] References Cited

U.S. PATENT DOCUMENTS

| | | | |
|---|---|---|---|
| 2,950,800 | 8/1960 | Caldwell | 400/110 |
| 3,325,786 | 6/1967 | Shashoua et al. | 400/110 X |
| 3,558,820 | 1/1971 | Baisch et al. | 400/482 X |
| 3,665,450 | 5/1972 | Leban | 340/731 |
| 3,780,846 | 12/1973 | Kolpek et al. | 400/697.1 X |
| 4,144,405 | 3/1979 | Wakamatsu | 340/751 X |
| 4,187,031 | 2/1980 | Yeh | 400/110 X |
| 4,323,315 | 4/1982 | Demonte et al. | 400/63 |
| 4,408,199 | 10/1983 | White et al. | 340/731 |

FOREIGN PATENT DOCUMENTS 2031626  4/1980  United Kingdom ................. 400/63

Primary Examiner—Ernest T. Wright, Jr.
Attorney, Agent, or Firm—Spencer & Frank

[57] ABSTRACT

Method for altering the supply of characters which are represented by data stored in the character generator of an ideographic typewriter and which can be displayed, under control of the character generator, in at least one standard character area of a display device for the display of ideographic characters, which method includes: displaying, in the standard character area, a first character for which data is already stored in the character generator; reducing the size of the first character displayed in the standard character area with respect to at least one dimension of the character if required; displaying, in the standard character area, at least one further character for which data is already stored in the character generator, to create a new character constituted by the first and further characters as thus displayed; and storing in the character generator data representing the new character which then forms part of the supply of characters.

15 Claims, 11 Drawing Figures

METHOD FOR CHANGING THE SUPPLY OF CHARACTERS IN AN IDEOGRAPHIC TYPEWRITER BY COMBINING AND STORING INDIVIDUAL CHARACTERS

BACKGROUND OF THE INVENTION

The present invention relates to a method for changing the supply of characters in the character generator of an ideographic typewriter which contains data for controlling a device for the display of such characters.

In order to permit machine processing of characters for display by means of a printer or for projection on a video screen, the data for the characters must be contained in a character memory or character generator of the machine. For alphabetic scripts this requires only a small amount of memory space. But the memory space becomes quite a problem when ideographic scripts which employ an extensive supply of characters are to be processed.

In the case of the Chinese script, for example, even if the simplified Chinese telegraph code were used, approximately 10,000 ideograms would have to be stored in the character generator, and up to 50,000 ideograms to cover all of the characters of the language. The problem becomes even more difficult to solve because some of the ideograms have very complicated designs which, particularly if the display is to have high accuracy and resolution, can be represented only by a large number of data bits.

Known methods attempt to solve this problem by separating the ideographic symbols into components and storing them in that form. Since the selected components are the basic building blocks for the ideographic characters, a larger supply of characters with comparatively few stored components can be contained in a character generator of such design. The call-up of the ideograms is then effected by suitable addresses assigned to individual components from which the finished ideographic character is composed within a standard character area, or space. For this purpose it has also been proposed to provide a single character display on which the components addressed by the operator are displayed until the desired ideographic character has been assembled.

But such a measure as well, which, due to the possibilities of multiple use of components for different characters, may involve a large amount of characters in a character generator of given size, does not permit the storage of even half of the 50,000 ideograms of, for example, the Chinese script.

SUMMARY OF THE INVENTION

It is an object of the present invention to vary such a limited supply of characters in the character generator of an ideographic typewriter as required.

The above and other objects are achieved, according to the present invention, by a novel method for altering the supply of characters which are represented by data stored in the character generator of an ideographic typewriter and which can be displayed, under control of the character generator, in at least one standard character area of a display device for the display of ideographic characters, which method includes: displaying, in the standard character area, a first character for which data is already stored in the character generator; reducing the size of the first character displayed in the standard character area with respect to at least one dimension of the character if required, and possibly shifting the character in a selected direction; displaying in the standard character area, at least one further character for which data is already stored in the character generator, to create a new character constituted by the first and further characters as thus displayed; and storing in the character generator data representing the new character which then forms part of the supply of characters. Preferably, the second as well as further characters are first displayed in at least one separate standard character area, are then possibly reduced in size and shifted in the separate character area, and are then shifted into the first-mentioned character area to a position corresponding to their respective position in the separate character area.

The advantages of the invention are, in particular, that the machine operator is able to construct new characters on a display by using the basic character components contained in the character generator as well as the already provided addressable characters, and these new characters can then be stored in the character generator and can be called up with their own address. This enables the operator of such a machine to individually construct required characters not contained in the supply of characters in the machine and to include them in his supply of characters. Since by means of suitable operating instructions, the basic characters can be compressed, shifted within the standard character area, or superposed on other characters, it is possible to produce a large multitude of other characters with a relatively small supply of characters.

Further advantages of the invention will become evident from the description to be presented below with reference to the drawing.

BRIEF DESCRIPTION OF THE DRAWING

FIG. 3 is a block circuit diagram of another embodiment of the invention.

DESCRIPTION OF THE PREFERRED EMBODIMENTS

Figure 1:
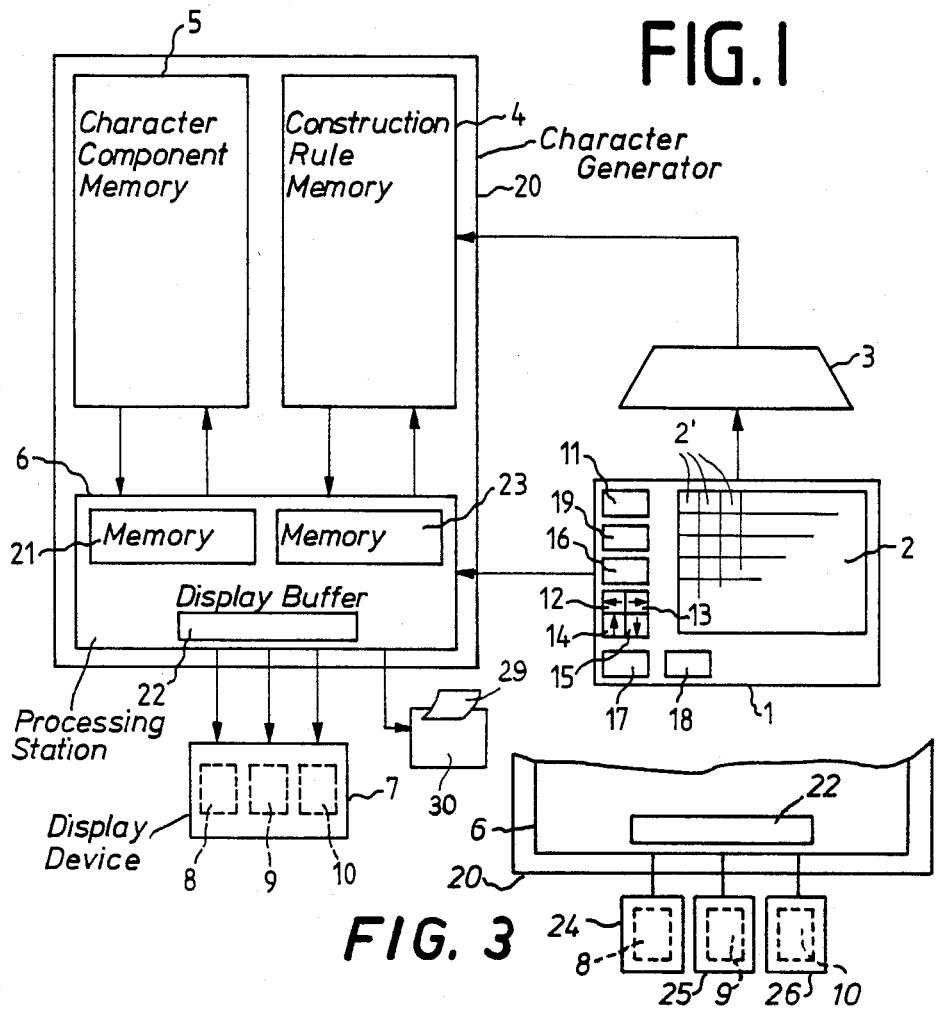
FIG. 1 is a block circuit diagram of a typewriter for ideographic characters capable of operating according to the invention.

The block circuit diagram of FIG. 1 for an ideographic typewriter described herein includes only those components which contribute to an understanding of the present invention. These components include a keyboard 1 which includes, in addition to a character input key array 2, a series of instruction input keys 2' to be described below. The signals from the input key array 2 are converted to addresses in a key coder 3 and these addresses are assigned to construction rules in a memory 4 forming part of a character generator 20. Each constructable ideographic character has an assigned construction rule according to which selected character components are read out of a character component memory 5, are possibly compressed pursuant to instructions from operators forming part of the construction rule, are arranged at a certain location within a standard character area and—if the character includes a plurality of components—are combined. A typewriter operating in this manner is described in greater detail in German Patent Application No. P 31 34 282 and corresponding copending U.S. application Ser. No. 412,798 filed Aug. 27, 1982.

The operating sequence is controlled by a processing station 6 into which are written and intermediately stored the selected construction rule from the construction rule memory 4 as well as the data for the character components from character component memory 5.

Each character assembled with the aid of a construction rule is placed into a display buffer 22 in the processing station 6 and is diaplayed on the display device 7. The display device 7 reproduces the character in a fine raster and is large enough that three characters can be displayed next to one another. The three outlines 8, 9, 10 shown in dashed lines constitute respective standard character areas from each one of the three characters and are either permanently marked on the display device 7 or are displayed together with the respective character to be displayed. It is also possible to provide three separate display devices 24, 25 and 26, one for each character, as shown in FIG. 3. The number of characters that can be displayed simultaneously need not be limited to three. Although it is sufficient to provide one display device 7 for only two characters, a larger number simplifies operation.

For the sake of clarity, the raster or vector printing mechanism, paper guide and receptacle, drives, controls etc. additionally required for the ideographic typewriter are not shown since they are generally known and have no significance to the contribution of the present invention.

The sequence involved in the assembly of a new character will now be explained with reference to FIGS. 2A–2I. It is assumed that the operator of the ideographic typewriter briefly outlined above intends to expand the supply of characters stored therein by the character shown in FIG. 2I while utilizing the supply of characters already contained in the character generator 20.

Figure 2A:
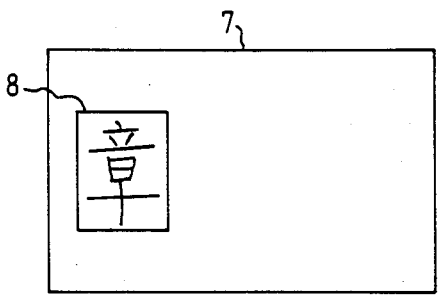
FIGS. 2A through 2I are pictorial diagrams illustrating the creation of a new character according to the invention.
Figure 2B:
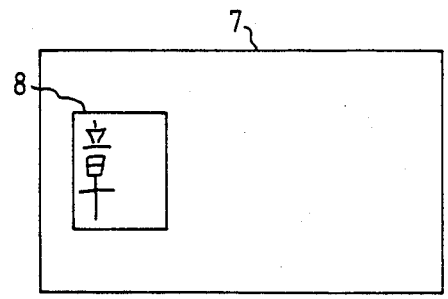

For this purpose, the operator first calls up from memory 4 the construction rule for the already existing character shown in FIG. 2A by manipulation of the character input key field 2, and via key coder 3, and intermediately stores this rule in intermediate memory 21 of processing station 6. Processing station 6 causes the data for the character components associated with the intermediately stored construction rule to be transferred from the character component memory 5 into processing station 6 and manipulated according to operators likewise contained in the construction rule in such a manner that control signals are present for the output of the complete character. The data are now transferred into the display buffer 22 of the processing station 6 and are displayed within the first standard character area 8 on display device 7, as shown in FIG. 2A.

The operator now actuates a key 11 which furnishes a compression instruction to the processing station 6 and then the operator actuates a direction key 12 whereupon the processing station 6 reduces the horizontal dimension of the displayed character by one elementary step to be flush with the left margin of the area 8. In a raster display of the characters, the size of one elementary step advisably corresponds to the distance between two raster points. Repeated actuation of the direction key 12 has the effect that further reductions in size are continued by one elementary step at a time.

In order not to mutilate the character during the compression process, the character elements which are significant for the meaning of the character must not be obliterated. Therefore, a compression rule memory 23 in the processing station 6 contains rules according to which the compression of a character is to take place.

As an example it may be stated here that a vertical line in a character must not disappear by the compression process. The compression effected by actuation of the compression key 11 and a direction key 12, 13, 14 or 15, thus causes the processing station 6 to compress the data of the character being processed only according to the rules of the set of compression rules stored in memory 23. The construction rule which is intermediately stored in the processing station 6 is also changed according to the instructions received from the compression key 11 and from the direction key 12, i.e. operators corresponding to the intended compression are included in the construction rule and the content of the display buffer 22 of the processing station 6 is likewise changed accordingly to thereby change the character display in the first standard character area 8 until the character shown in FIG. 2B appears within the standard character area 8.

Figure 2C:
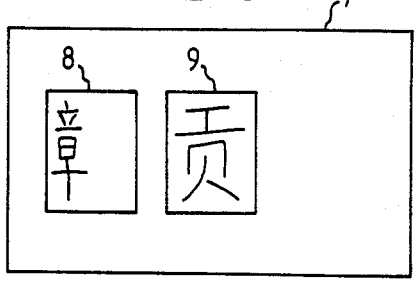
Figure 2D:
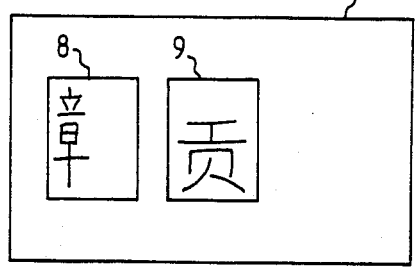

The operator now puts in the second character—available in the character supply provided in the construction rule memory 4—with the aid of the character input key field 2, whereupon this character is assembled from character components in the above described manner according to the addressed construction rule and is displayed in the second standard character area 9, as shown in FIG. 2C. Now the compression key 11 is actuated again and then the direction key 15 which produces a vertical compression of the character in the direction toward the lower edge of area 9. After the appropriate number of actuations of the direction key 15 and the resulting compression of the second character by several elementary steps, the display on display device 7 as shown in FIG. 2D results.

Figure 2E:
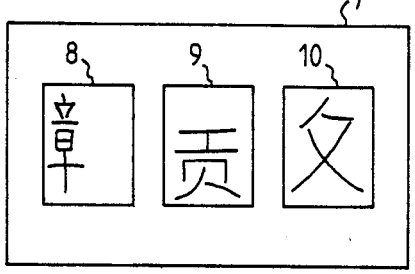
Figure 2F:
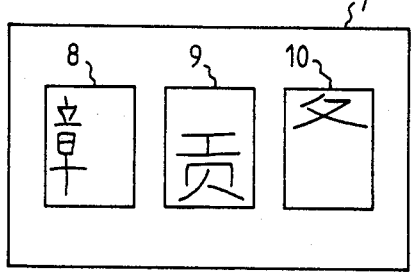

After putting in the third character, which is displayed in the third standard character area 10 of the display device 7, as shown in FIG. 2E, the operator actuates the compression key 11 as well as the direction key 14 to obtain, after the corresponding number of actuations, the display shown in FIG. 2F.

Figure 2G:
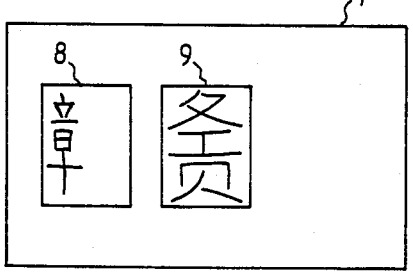

Then, actuation of a superposition key 16 has the result that the display in the third standard character area 10 is transferred to the second standard character area 9, as shown in FIG. 2G. In addition to combining the character data for display in the standard character area 9, the construction rule for the third character is combined in processing station 6 with the previously varied construction rule for the second character so that now a single construction rule is intermediately stored for the character displayed in the second standard character area 9. The construction rule for the character displayed in the first standard character area 8 is also still intermediately stored.

Figure 2H:
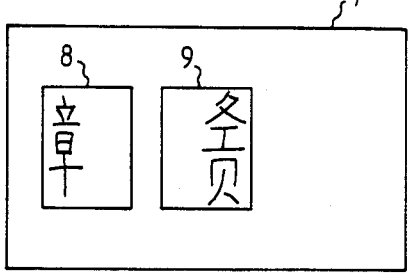
Figure 2I:
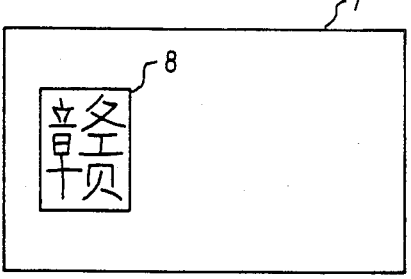

The character resulting from this operation and displayed in the second standard character area 9 is now compressed in the direction to be flush with the right margin by actuation of the compression key 11 as well as a direction key 13 until it takes on the apperance shown in FIG. 2H. Renewed actuation of superposition key 16 finally causes the display of the second character area 9 to be transferred into the first standard character area 8 and thus the desired character is completed, as shown in FIG. 2I. The system is constructed to effect, by actuating superposition key 16, a character transfer from the last character area which is currently displaying a character to the respective foregoing character area.

The intermediately stored construction rules in processing station 6 have been changed according to the compression and superposition measures taken and have been supplemented by operators so that with the last superposition instruction there has been created a construction rule which describes the desired final character. Actuation of an end key 17 in conjunction with the input of an address via the character input key array 2 has the result that the new construction rule is stored in the construction rule memory 4 to be called up again under the stored address. The newly constructed character has now become a component of the character supply in the ideographic typewriter and can be selected by the machine operator at any time by putting in the associated address.

The processing station 6 may additionally be provided with a function which—for example, after actuation of the end key 17—effects optimization of the newly created construction rule. The reason for this optimization is the elimination of redundancy as a result of the inclusion of a series of elementary steps in various directions and of superpositions. Steps which cancel one another out and elementary steps which can be replaced by a single instruction for a correspondingly larger step instead of a plurality of individual stepping instructions are optimized by such a function so that the newly created construction rule is not unduly long.

In the above description it has been assumed that space is available in the construction rule memory 4 for the storage of newly created construction rules. It is also possible to provide an opportunity for storage of a newly created construction rule at an already occupied location with the prior content of the associated memory cells being erased first or by the new storage process.

Since, for the creation of a character, all construction instructions are fed into the processing station 6 in succession and are stored in this sequence for processing, there also exists the possibility of invalidating, or cancelling, the instructions in the reverse order. For this purpose, an erase key 18 is provided in the keyboard 1 the actuation of which results in the erasure of the last put-in instruction. The machine operator can thus easily cancel an instruction for a change which he has found to be incorrect on the display device 7. The processing station 6 treats such an erase instruction in the same way as it processes a compression or superposition instruction: it removes the instruction from the construction rule contained in the intermediate memory 21, changes the contents of the display buffer 22 and thus causes a change in the display on display device 7.

The keyboard 1 also includes a positioning key 19 the actuation of which causes a character displayed on the display device 7 to be shifted in the respective standard character area 8, 9, 10 by one elementary step based on the subsequent actuation of one of the direction keys 12 to 15 without any change in the shape of the character. Other instruction keys for manipulation of the characters, such as, for example, the input of an instruction to rotate the character by 90° etc., may also be provided.

According to another embodiment it is also conceivable for the characters, instead of being displayed on a display device 7, to be printed on a record carrier 29, after each changing step, by the printer 30 of the ideographic typewriter. The machine operator can follow the stepwise changes of the characters until they have their final shape. It would then be possible to change each individually called up character which is to be used in the final character to be changed in its own line while a superposition instruction would superpose the respective last characters of two lines.

Instead of the above-mentioned screen printer 30 as well as screen display 7, the device according to the present invention can also be used for vector printers and in other than screen display devices 7, it merely being necessary to divide the actuatability of display device 7 and printer 30 into elementary steps so that the described compression of the characters can be performed. Instead of the instruction keys 2' used in the described embodiment, it is also possible to provide key combinations or other input means for instruction input. Without deviating from the basic concept of the invention, it is also possible to form in the same manner other graphic displays instead of ideographic scripts from stored graphic components.

As described previously, compression occurs according to fixed rules which are contained in the compression rule memory 23. The compression rules contain superposition instructions for the respective components, according to which selected parts of a component or components are shifted over one another. Particular care must be taken that no significant graphic information is lost and no unproportionally thick lines or parts of the character result. E.g., in a 24×24 matrix ink jet printer on which the present embodiment could be based, compression can be effected by suppressing the horizontal stepping movement of the vertical row of nozzles at selected points to produce horizontal compression and by suppressing the line shift during actuation of the matrix lines at selected locations for vertical compression. Accordingly, in the data defining compressed characters the information for the respective suppressed horizontal and/or vertical steps have to be eliminated. The shifting of characters may be effected in a similar way. In a 24×24 matrix printer or matrix display shifting of one elementary step might be equal to omitting or adding one blank step in horizontal direction between the foregoing and the current character or one elementary step in vertical direction. The data defining shifted characters then have to be altered accordingly.

Other measures are also conceivable, for example a reduced horizontal step to produce compression. Another method for compression and shifting of characters is disclosed in the Leban U.S. Pat. No. 3,665,450.

Another embodiment of the invention is illustrated in FIG. 3. Instead of the display device 7 of FIG. 1 there are provided three separate display devices 24, 25, 26, each of which having a standard character area 8, 9, 10. They are connected to the processing station 6 in the same way as described in connection with FIG. 1 and are controlled likewise.

It will be understood that the above description of the present invention is susceptible to various modifications, changes and adaptations, and the same are intended to be comprehended within the meaning and range of equivalents of the appended claims.

What is claimed is:

1. Method for operating an ideographic typewriter having input means, a character generator having memory means containing memory locations which can be addressed via the input means, and a display device, the display device having at least one standard character area for the display of ideographic characters, and the memory means of the character generator storing data representing a supply of characters which can each be displayed in the standard character area, said method being carried out for altering the supply of characters represented by the data stored in the character generator, and comprising: displaying, in the standard character area, a first character for which data is already stored in the character generator; reducing the size of the first character displayed in the standard character area with respect to at least one dimension of the character if required; displaying, in the standard character area, at least one further character for which data is already stored in the character generator, to create a new character constituted by the first and further characters as thus displayed; and storing in a location of the memory means of the character generator, which location can be addressed via the input means, data representing the new character which then forms part of the supply of characters.

2. Method as defined in claim 1 wherein the display device presents at least a second standard character area, and the outline of each character area is delineated on the display device, and further comprising, before said step of displaying further characters in said one standard character area, preliminarily displaying the further characters in the second standard character area simultaneously with the display of the first character in said one character area.

3. Method as defined in claim 2 wherein said step of displaying the second character in said one standard character area is carried out by producing a superposition instruction for transferring the second character from the second standard character area, and the data representing the new character is a combination of the data representing the first and second characters.

4. Method as defined in claim 1 wherein there is provided at least a second display device presenting a respective standard character area, each display device having a display field corresponding in size to a standard character area.

5. Method as defined in claim 4, further comprising, before said step of displaying the second character, preliminary displaying the second character in the standard character area of the second device, and wherein said step of displaying the second character in said one standard character area is carried out by producing a superposition instruction for transferring the second character from the character area of the second device, and the data representing the new character is a combination of the data representing the first and second characters.

6. Method according to claim 1 wherein the character area is divided horizontally and vertically into elementary steps, and said step of reducing causes a horizontal or vertical reduction in size of the displayed character by the size of one elementary step at a time.

7. Method as defined in claim 6 wherein said step of reducing comprises providing a shift instruction for causing a horizontal or vertical shift of the character by one elementary step within the standard character area.

8. Method as defined in claim 6 wherein the elementary step corresponds to the grid spacing of a screen display device or of a screen printer.

9. Method as defined in claim 1 wherein the character generator includes a character component memory containing data representing character components, and a construction rule memory containing data representing a set of construction rules determining the character components associated with each character in the supply and defining operators identifying the dimensions and location of the associated character in the standard character area, and said step of storing comprises storing data representing the construction rule determining the new character.

10. Method as defined in claim 9 wherein said step of reducing is carried out by changing the operators of the construction rule associated with the first character.

11. Method as defined in claim 9 wherein the construction rules for characters displayed on the display device and to be modified are intermediately stored in an intermediate memory until the construction rule for the new character has been completed.

12. Method as defined in claim 1 wherein said steps of reducing the size of the first character and displaying the second character are performed in response to successive instructions which are stored, and wherein at least the last instruction provided can be cancelled by a counterinstruction.

13. Method as defined in claim 7 wherein the elementary step corresponds to the grid spacing of a screen display device or of a screen printer.

14. Method as defined in claim 10 wherein the construction rules for characters displayed on the display device and to be modified are intermediately stored in an intermediate memory until the construction rule for the new character has been completed.

15. A method as defined in claim 1 further comprising, after said step of storing, actuating the input means for addressing the memory means of the character generator to display the new character.

* * * * *